US005324380A

United States Patent [19]

Marin

[11] Patent Number: 5,324,380

[45] Date of Patent: Jun. 28, 1994

[54] METHOD FOR MASKING CONFIDENTIAL WRITTEN MATERIAL

[76] Inventor: Thomas C. Marin, 2113 Keith Rd., Abington, Pa. 19001

[21] Appl. No.: 927,565

[22] Filed: Aug. 10, 1992

Related U.S. Application Data

[60] Continuation of Ser. No. 591,692, Oct. 2, 1990, abandoned, which is a division of Ser. No. 455,097, Dec. 22, 1989, Pat. No. 5,013,088.

[51] Int. Cl.5 ............................................ B32B 31/00

[52] U.S. Cl. .................................. 156/247; 156/230; 283/81; 283/101; 283/901; 428/915; 428/916

[58] Field of Search ...................... 156/230, 234, 247; 283/81, 101, 105, 108, 111, 901; 428/915, 916

[56] References Cited

U.S. PATENT DOCUMENTS 2,812,957 11/1957 Sarlund .......................... 283/105 X
3,900,219 8/1975 D'Amato et al. .................. 283/101
4,210,688 7/1980 Sato ............................... 156/256 X
4,746,556 5/1988 Matsuguchi et al. ........... 428/916 X

*Primary Examiner*—Michael W. Ball
*Assistant Examiner*—James J. Engel, Jr.
*Attorney, Agent, or Firm*—Synnestvedt & Lechner

[57] ABSTRACT

A method for determining whether confidential written material has been tampered with. The disclosed invention comprises the following steps: applying a removable adhesive to one side of an opaque paper masking label; cutting intermittent slits in said opaque paper masking label; embossing the adhesive side of said slit opaque paper masking label over confidential written material to be masked such that when said embossed opaque paper masking is removed from said material to be masked, said opaque paper masking label fragments and disintegrates due to the intermittent slits.

6 Claims, 3 Drawing Sheets

FIG:2A

FIG. 5
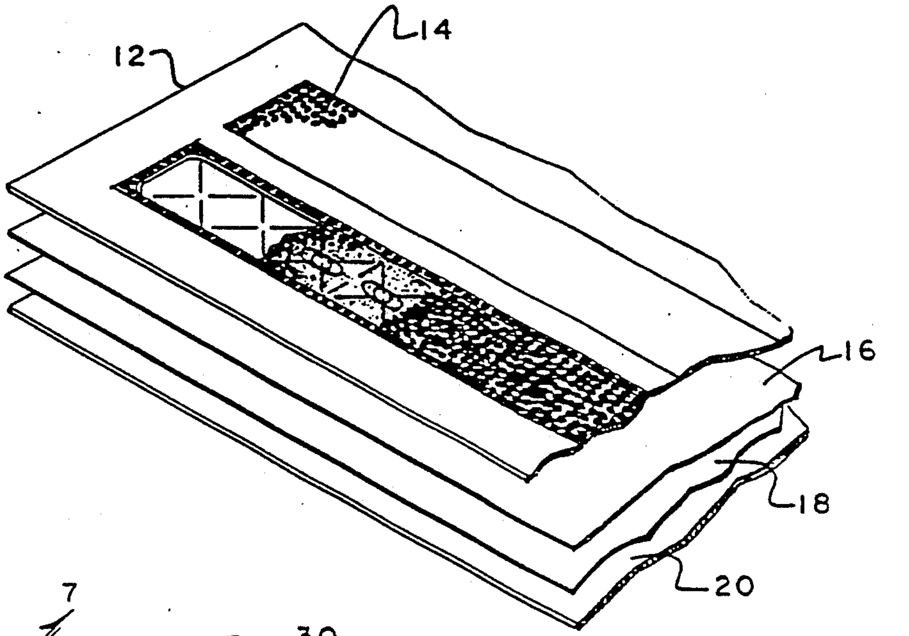
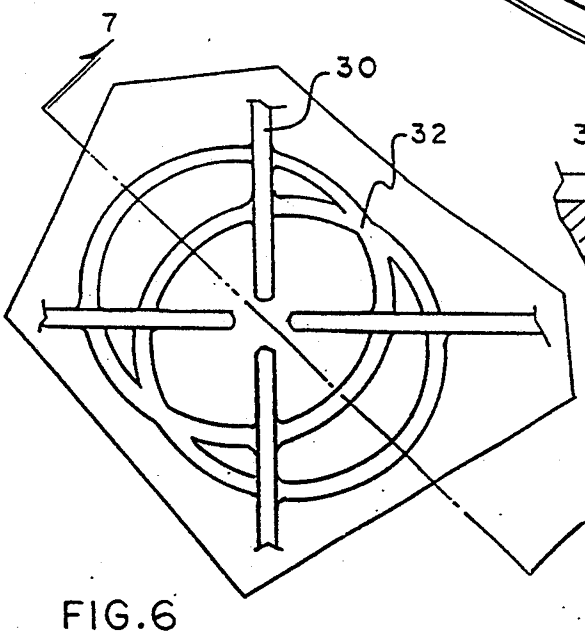
FIG.6
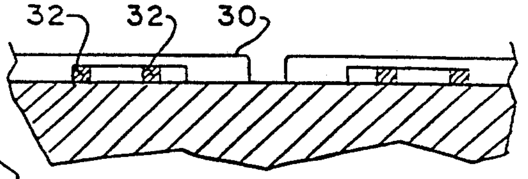
FIG.7

METHOD FOR MASKING CONFIDENTIAL WRITTEN MATERIAL

RELATED APPLICATIONS

This application is a continuation of copending U.S. Ser. No. 07/591,692, filed Oct. 2, 1990, now abandoned, and a division of co-pending U.S. Ser. No. 455,097, filed Dec. 22, 1989, now U.S. Pat. No. 5,013,088.

FIELD OF THE INVENTION

The present invention is directed to methods for masking or blocking confidential written matter. In particular, the present invention is directed to methods of masking confidential written material such as research data, medical records, academic records and the like, so as to provide evidence of tampering.

BACKGROUND OF THE INVENTION

The present invention is directed to a method incorporating novel disintegratable masking label which can be placed over confidential written material, and which fragments and disintegrates upon removal so as to provide evidence of tampering.

In today's research, business, academic and bio-medical environments, the integrity and absolute confidentiality of test results has achieved paramount importance. This is particularly true, for example, with respect to the written results of employee medical records on such matters as drug analysis. Numerous private and governmental entities have begun routinely conducting urinalysis testing for drug and alcohol dependency. It is important, both for the integrity of the test, and the confidentiality and privacy of the testee, that such results not be altered.

Previous efforts at providing tamper-proofing have been largely directed towards preventing the tampering of the packaging for pharmaceuticals and food products. This became a particularly serious problem in the early 1980s when the products of several leading drug manufacturers were altered, leading to the deaths of several individuals. There are a large number of patents which are directed toward detecting and preventing the tampering of pharmaceuticals and foodstuffs.

There have also been efforts at protecting the integrity and confidentiality of written matter. Previous products in this area have utilized multiple layered adhesive labels which were placed over confidential written material. The first layer would contact the written material with the second or top layer adhering to the first. When an attempt is made to remove the top layer, it pulls off parts of the underlying second layer thereby providing evidence of tampering. Labels produced in this manner are relatively expensive and do not always tear properly. Labels of this type also frequently destroy the underlying written material upon removal.

Finally, removable paints have been developed for masking written materials. These paints can be both messy and difficult to apply.

The present invention is directed to a novel label structure which is placed over written matter on a page and which is configured to fragment and disintegrate upon removal. This product, therefore, is useful in identifying whether confidential written results have been tampered with or altered.

The present invention utilizes a single layer structure including sets of tamper-proof slits or cuts. The label is applied directly to an underlying paper surface containing confidential written material and is firmly burnished thereon. When the label is removed, it breaks apart at the slits or cuts, thus providing clear evidence of tampering. Because of the minuteness of the fragmentation, it is impossible to reconstruct the label so as to eliminate the evidence of tampering. The label is adhered with a removable adhesive and therefore does not destroy the underlying written matter upon removal.

In view of the above, it is an object of the present invention to provide a single layer disintegratable masking label which thereby evidences tampering.

It is an additional object of the present invention to provide an inexpensive masking label which can be utilized to determine whether research has been tampered with or violated.

It is still a further object of the present invention to provide a masking label which disintegrates upon removal from a masked medium.

It is still yet a further object of the present invention to provide a masking label containing tamper-proof cuts which cause the label to disintegrate upon removal from a masked medium.

SUMMARY OF THE INVENTION

In accordance with the present invention, a method for determining whether confidential written material has been tampered with comprising the following steps: applying a removable adhesive to one side of an opaque paper masking label; cutting intermittent slits in said opaque paper masking label; burnishing the adhesive side of said slit opaque paper masking label over confidential written material to be masked such that when said burnished opaque paper masking is removed from said material to be masked, said opaque paper masking label fragments and disintegrates due to the intermittent slits.

BRIEF DESCRIPTION OF DRAWINGS

The foregoing Summary as well as the following Detailed Description will be better understood when read in conjunction with the Figures appended hereto. For the purpose of illustrating the invention, there is shown in the drawings an embodiment which is presently preferred, it being understood, however, that this invention is not limited to the precise arrangements and instrumentalities shown.

FIG. 5 is an exploded view of the disintegratable masking label of the present invention.

FIG. 6 is a plan view of the die for manufacturing the label of the present invention.

FIG. 7 is a section view of the die for manufacturing the label of the present invention along line 7—7 of FIG. 6.

DETAILED DESCRIPTION OF THE PREFERRED EMBODIMENTS

Figure 1:
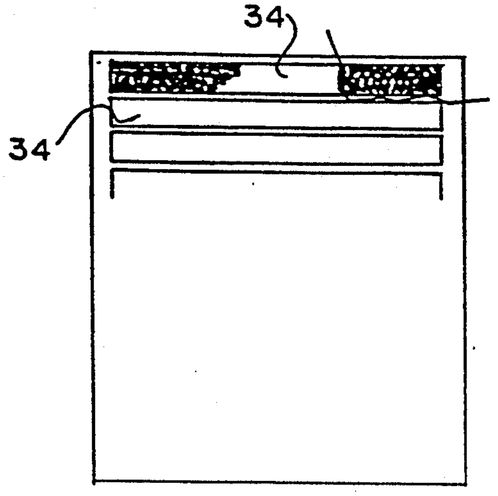
FIGS. 1 and 1A are partially broken away plan views of the disintegratable masking label of the present invention with a silicone coated polystyrene liner paper.
Figure 1A:
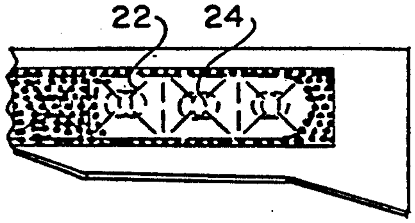

The present invention is described with reference to FIGS. 1-7 wherein the same numbers are used where applicable. Referring to FIGS. 1, 1A, 2, 2A and 5, the disintegratable masking label 10 of the present invention is shown. The label 10 is constructed from a paper 12 and preferably comprises a matted litho-label stock which possesses excellent print characteristics. As shown, the label has a dot pattern 14 printed thereon. It is noted that any pattern may be printed on the litho-stock of the present invention. As shown more particularly in the exploded view of FIG. 5, the underside of the paper 12 is coated with an opaque coating 16. Beneath the opaque coating 16, the label 10 is coated with a rubber based removable adhesive 18 featuring a moderately high tack and internal strength. An example of an adhesive 18 which may be utilized in the present invention is sold under the specification R-130 by Fasson, Incorporated of Grand Rapids, Mich. The label with adhesive is then secured onto a polystyrene liner 20 which is coated with silicone.

Referring to FIGS. 1, 1A, 2 and 2A, the label contains cuts or slits 22. The cuts or slits 22 form a plurality of X-shaped diagonal slits which are stamped completely through paper 12 and which cut through the polystyrene liner 20. The cuts extend radially from the center of the label 10. Additional cuts forming overlapping or interlocking rings 24 are simultaneously made on the center of the label. The rings 24 may be whole or perforated. These cuts do not permeate the silicone coated polystyrene lining 20. Finally, vertical perforated cuts 26 are interspersed throughout the label stock and may frame each set of diagonal radial cuts 20 and interlocking rings 24. The perforated cuts 26 permit the label to be removed at precise locations or torn into desired or predetermined lengths. It is to be appreciated that the spacing of the perforations can be customized according to the desired application. For example, a particular hospital or research institute may identify patients according to a 12-digit character string having a length of 2 inches. In such an application, the perforations 26 could be spaced at 2-inch intervals.

FIGS. 6 and 7 illustrate a die 28 which may be utilized to form the disintegratable masking label of the present invention. As shown, the die includes a pronounced diagonal X-shaped blade 30 to cut completely through the paper 12 and polystyrene liner 20. The die further includes less pronounced centrally located ring-shaped blades 32 to produce the interlocking ring structure. Alternatively, the ring-shaped blades 32 may be designed to create perforated rings. Additionally, the die may also include blades to create the vertical perforated cuts 26 (not shown).

Figure 2:
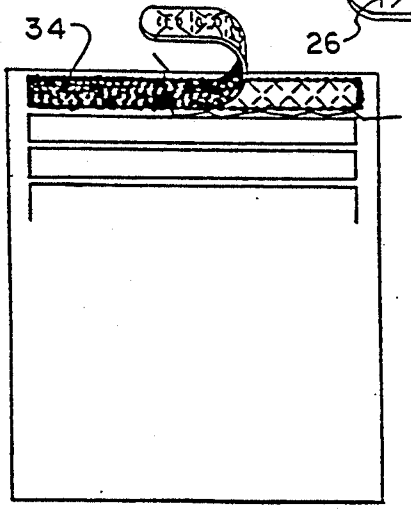
FIGS. 2 and 2A are partially broken away plan views of the disintegratable label of the present invention being peeled from the liner paper.
Figure 2A:
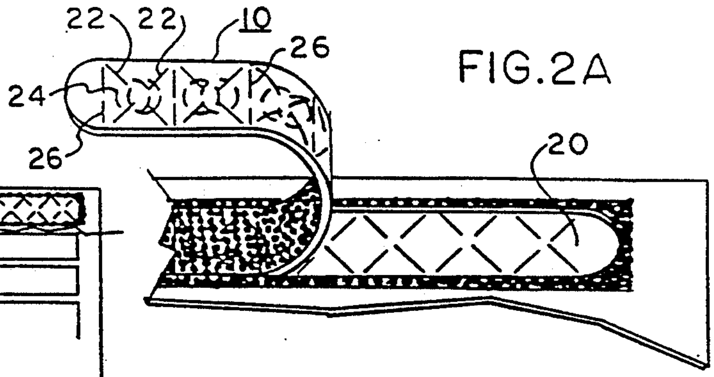

A commercial embodiment of the present invention is shown in FIGS. 1 and 2. The labels 10 form rows of horizontal strips 34 adhered to the polystyrene liner 30. It is to be appreciated that the labels may take any desired shape. As shown in FIG. 2, a strip of desired length is peeled from the polystyrene liner 20 and torn along the appropriate perforation 26. The adhesion of the label to the polystyrene backing must not be such as to cause the label to fragment and disintegrate when it is peeled from the polystyrene structure.

Figure 3:
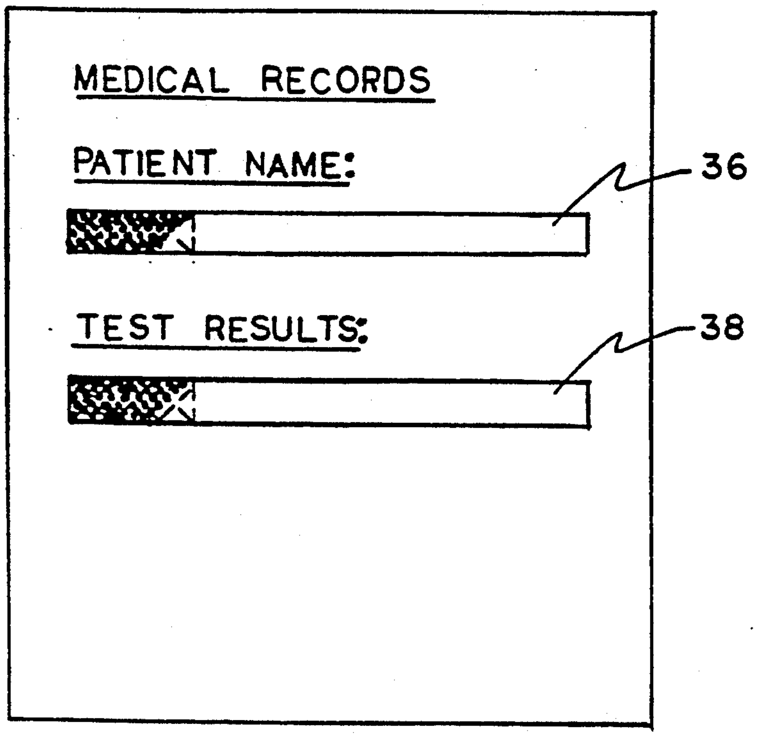
FIGS. 3 and 4 illustrate the application of the disintegratable masking label of the present invention to patient medical records both before and after tampering.
Figure 4:
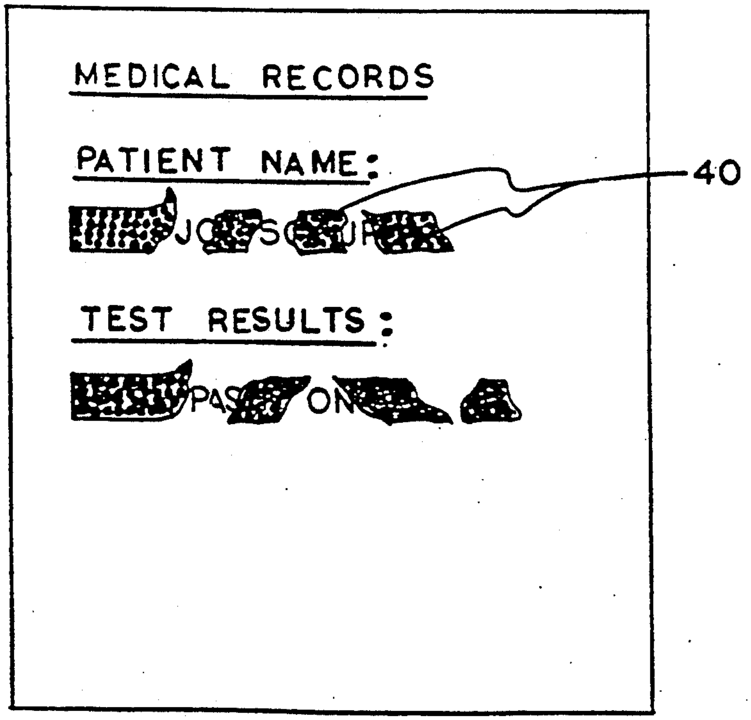

As shown in FIGS. 3 and 4, the label strip portion is then placed over, for example, confidential medical records. As shown in FIG. 3, the patient's name 36 and confidential test results 38 have been blocked out by the label. For best results, upon application of the label to the test result, the paper should be turned over and the label burnished through the rear of the paper. As seen in FIG. 4, when an attempt is made to peel the label from the medical records, the label fragments and disintegrates 40 due to the existence of the diagonal tamper-proof die cuts 22 and interlocking rings 24. Broken sections of the label remain on the test form. Because the fragmented portions are so minute, the label cannot be reconstructed without providing clear evidence of tampering. The printed pattern further serves to highlight the tampering. Moreover, because the label is constructed using a removable adhesive, it will not adhere to and tear off the masked written material upon removal.

While the present invention has been described with reference to the enclosed Figures, it is to be appreciated by those skilled in the art that other embodiments fulfill the spirit and scope of the present invention, and that the true nature and scope of the present invention is to be determined with reference to the claims appended hereto. Specifically, while the present invention has been described in the context of an example involving medical records, it will be readily apparent to those skilled in the art that the present invention may be utilized in all manner of scientific research, business, academia, educational testing, law enforcement, and sports. In short, the label can be utilized in any application where it is necessary to protect the integrity and confidentiality of written matter.

In addition, while the present invention has been described as incorporating X-shaped cuts and overlapping rings, it is to be appreciated that numerous alternatively shaped cuts can be utilized in the present invention.

Finally, while the label of the present invention has been described in the context of a label strip, it is to be appreciated that the label of the present invention may assume any desired shape, height and/or width.

What is claimed is:

1. A method for determining whether confidential written material has been tampered with comprising the following steps:

applying a removable adhesive to one side of an opaque paper masking label;

cutting a plurality of intermittent slits in said opaque paper masking label;

burnishing the adhesive side of said slit opaque paper masking label over confidential written material so that said adhesive and said slits overlie the confidential written material to be masked such that when said burnished opaque paper masking is removed from said material to be masked, said opaque paper masking label fragments and disintegrates due to the combined interaction of said intermittent slits and adhesive, while not destroying said underlying written matter, whereby said disintegration of said label evidences tampering.

2. The method of claim 1 wherein said intermittent slits comprise slits extending radially from the center of said opaque paper masking label.

3. The method of claim 1 wherein said slits comprise at least two interlocking ring-shaped slits.

4. A method for determining whether confidential written material has been tampered with comprising the following steps:

applying a removable adhesive to one side of a single layer masking label having an opaque coating, said adhesive having a level of adhesion such as to permit the disintegration of the masking label upon removal while not destroying any underlying confidential written matter to be masked;

cutting intermittent radially extending slits in said opaque paper masking label;

burnishing the adhesive side of said slit opaque paper masking label over said confidential written material so that said adhesive and said slits overlie the confidential written material to be masked such that when said burnished opaque paper masking is removed from said material to be masked, said opaque paper masking label fragments and disintegrates due to the combined interaction of said intermittent slits and adhesive, while not destroying said underlying written matter, whereby tampering is evidenced.

5. The method of claim 4 wherein said slits further comprise at least two interlocking ring-shaped slits.

6. A method for determining whether confidential written material has been tampered with comprising the following steps:

applying a removable adhesive to one side of single layer opaque paper masking label strip, said adhesive having a level of adhesion such as to permit removal of the label without destroying any underlying written matter;

cutting a plurality of intermittent interlocking ring-shaped slits in said opaque paper masking label strip;

burnishing the adhesive side of said slit opaque paper masking label over confidential written material so that said adhesive and said slits overlie the confidential written material to be masked such that when said burnished opaque paper masking is removed from said material to be masked, said opaque paper masking label fragments and disintegrates due to the combined action of said adhesive and intermittent interlocking ring-shaped slits without destroying said underlying written matter, whereby tampering is evidenced.

* * * * *